US007820285B1

(12) United States Patent
Pittman, Jr. et al.

(10) Patent No.: US 7,820,285 B1
(45) Date of Patent: Oct. 26, 2010

(54) ROCKET MOTOR INSULATION

(75) Inventors: Charles U. Pittman, Jr., Starkville, MS (US); Rusty L. Blanski, Lancaster, CA (US); Joseph H. Koo, Austin, TX (US); Patrick N. Ruth, Tehachapi, CA (US); Shawn H. Phillips, Lancaster, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 484 days.

(21) Appl. No.: 11/357,465

(22) Filed: Feb. 10, 2006

(51) Int. Cl.
*B32B 5/02* (2006.01)

(52) U.S. Cl. .................. 428/324; 264/497; 425/174.4; 425/375

(58) Field of Classification Search .............. 523/138; 428/324; 264/497; 425/174.4, 375
See application file for complete search history.

(56) References Cited

U.S. PATENT DOCUMENTS

| | | | | |
|---|---|---|---|---|
| 4,956,397 A | * | 9/1990 | Rogowski et al. ........... 523/138 |
| 5,498,649 A | * | 3/1996 | Guillot ....................... 524/100 |
| 5,603,170 A | * | 2/1997 | Hirai .......................... 36/34 R |
| 6,680,016 B2 | * | 1/2004 | Wang et al. ................. 264/105 |
| 6,691,505 B2 | * | 2/2004 | Harvey et al. ................. 60/253 |
| 7,045,088 B2 | * | 5/2006 | Matsumiya et al. ..... 264/328.18 |
| 7,494,946 B2 | * | 2/2009 | Gibson et al. ............... 442/354 |
| 2002/0018847 A1 | * | 2/2002 | Guillot ....................... 427/230 |
| 2002/0137871 A1 | * | 9/2002 | Wheeler et al. ............... 528/44 |
| 2007/0290410 A1 | * | 12/2007 | Koo et al. ................... 264/497 |

* cited by examiner

*Primary Examiner*—Peter D. Mulcahy
*Assistant Examiner*—Henry Hu
(74) *Attorney, Agent, or Firm*—AFMCLO/JAZ; Thomas C. Stover

(57) ABSTRACT

Provided is a solid rocket motor (SRM) insulation, wherein carbon nano fibers (CNF) are blended into a polyurethane matrix so as to disperse the CNF in the polymer. The so blended material is then extruded, injection molded or sprayed on or into the desired shape. Such SRM insulation has reduced ablation over prior art insulations, resulting in reduction in weight of the insulation needed in such rockets, permitting increase of payload therein.

9 Claims, 2 Drawing Sheets

Injection-molded sample cones prior to test-firing

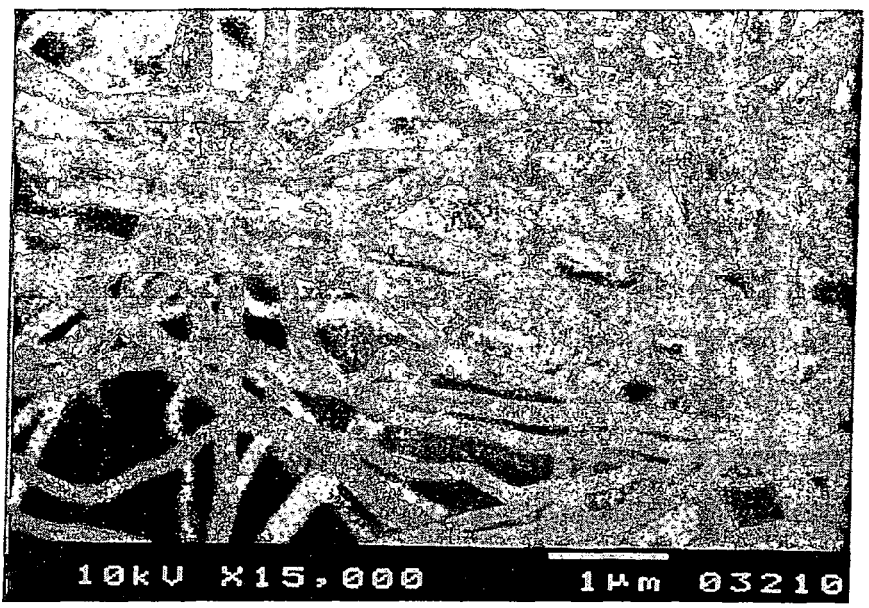
Figure 1. Scanning electron microscope image of raw carbon nanofibers prior to blending in the polymer matrix.
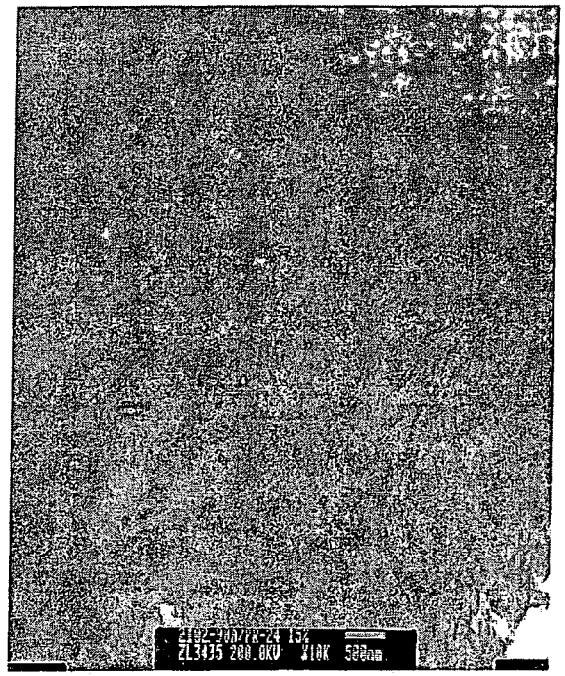
Figure 2. TEM image showing uniformly dispersed carbon nanofibers in thermoplastic elastomer matrix.

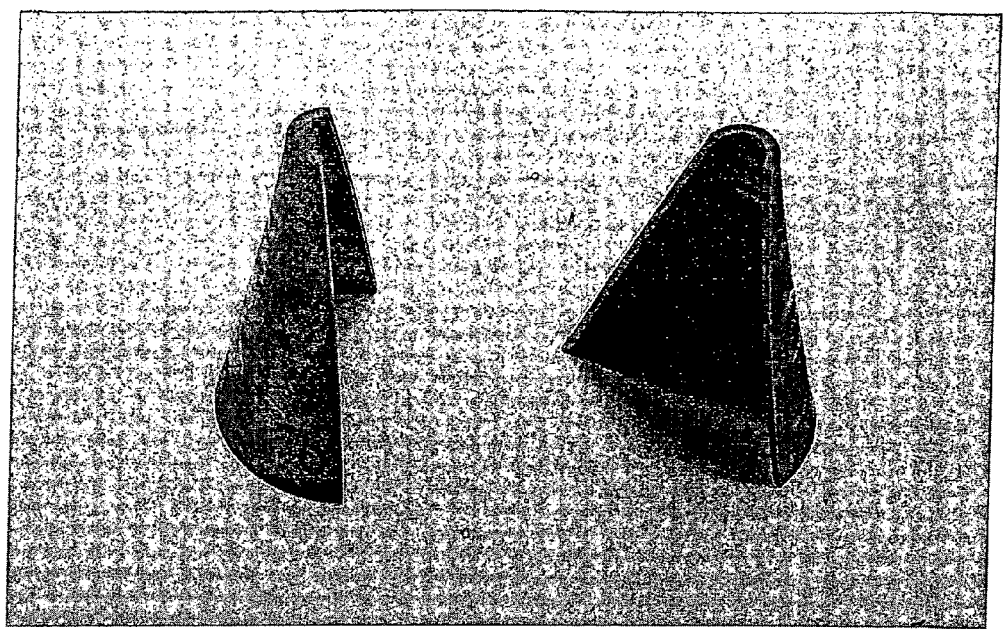
Figure 3. Injection-molded sample cones prior to test-firing
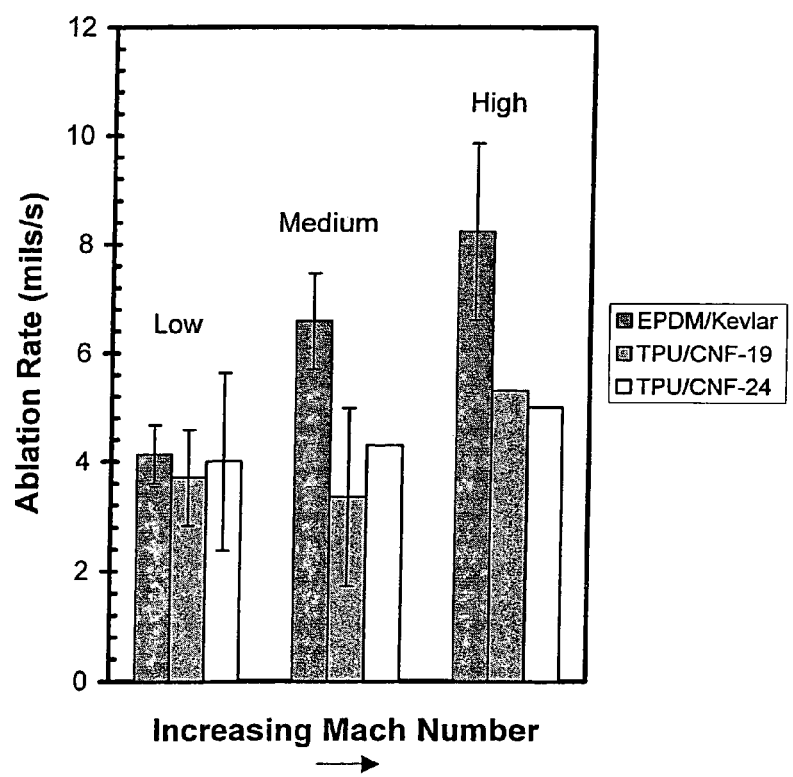
Figure 4. Ablation rate versus Mach number region after exposure to solid rocket motor exhaust

ROCKET MOTOR INSULATION

STATEMENT OF GOVERNMENT INTEREST

The invention described herein may be manufactured and used by or the Government for governmental purposes without the payment of any royalty thereon.

RELATED PATENT APPLICATIONS

None

FIELD OF THE INVENTION

This invention relates to rocket motor insulation, particularly solid rocket motor insulation.

BACKGROUND OF THE INVENTION

The current state of the art in solid rocket motor (SRM) insulation is an EPDM rubber with a filler of Kevlar fibers or silica. The disadvantage of these systems include the inability to process the material after the final curing as well as increased difficulty in processing these materials with an incompatible filler on the size scale of Kevlar™ fibers or fumed silica. Also these formulations cannot be successfully sprayed onto a motor case.

Conventional carbon fibers (5-10 microns in diameter) have been looked into to replace Kevlar™ in SRM insulation with good results. A drawback of this technology is the use of exotic extrusion techniques in order to maintain the original aspect ratio of the carbon fibers. The use of Vapor Grown Carbon Fiber has also been described as a filler in EPDM systems, but it too suffers from the same post processing issues as the EPDM/Kevlar and cannot be sprayed.

Accordingly, there is need and market for SRM insulation that overcomes the above prior art shortcomings.

There has now been discovered an SRM insulation that has ease of processing, can be applied by advanced spraying techniques and has improved durability, as described below.

SUMMARY OF THE INVENTION

Broadly the present invention provides a solid rocket motor insulative layer comprising, carbon nano fibers blended in a polyurethane matrix. Such polymer matrix can be, for example, a thermoplastic polyurethane (TPU), or a system that contains the components of a polyurethane (polyol and/or polyisocyanate, linear or crosslinkable)

The invention also provides a method for forming an insulative layer between solid rocket propellant and rocket motor casing comprising, blending carbon nano fibers (CNF) in a thermoplastic polyurethane matrix to form such blend as a layer.

BRIEF DESCRIPTION OF THE DRAWINGS

The invention will become more apparent from the following detailed specification and drawings, in which;

FIG. 1 is an enlarged fragmentary elevation view of a scanning electron microscope image of raw carbon nano fibers, prior to blending in a polymer matrix FIG. 2 is a fragmentary elevation view of a TEM image, showing uniformly dispersed carbon nano fibers in a thermoplastic elastomer matrix;

FIG. 3 is a perspective view of two halves of a cone made of the SRM insulation of the present invention and FIG. 4 is a graph showing ablation rate v. mach number region, after exposure to solid rocket motor exhaust, of three types of SRM insulation.

DESCRIPTION OF PREFERRED EMBODIMENTS

Referring to the present invention in detail, the purpose of this invention is to provide an insulative layer between the solid propellant and the rocket motor casing during combustion. Disclosed herein is a new material system of carbon nanofibers (CNF) blended in a thermoplastic elastomer matrix for solid rocket motor insulation. The fibers are described as CNF, which differ from conventional continuous or milled carbon fibers (5-10 microns in diameter) and are considerably larger than single or multiwall carbon nanotubes (1-10 nanometers in diameter). The fibers provide an anchoring system which prevents the rapid ablation of the polymer matrix as it chars in the solid rocket motor exhaust. An example of the raw fiber component is shown in FIG. 1. The CNFs are in the diameter range of 50-150 nm with a length range of 50-100 microns, which yields aspect ratios of 500-3000.

The fibers are blended through current state-of-the-art techniques such as twin screw extrusion with a goal of uniform dispersion of the fibers, randomly oriented in the matrix material. This uniform dispersion is shown in a series of transmission electron microscopy (TEM) images in FIG. 2. The fibers can also be blended by co-spraying (concentric spraying) the fibers with urethane components (polyols & polyisocyanates). The thermoplastic elastomer matrix in this invention, a thermoplastic polyurethane elastomer, provides an advantage over current state-of-the-art elastomer matrices due to the ease of processing and net-shaping. The thermoplastic component allows the polymer blend to be extruded and injection molded into its final form, versus the current method which entails cutting a sheet product and performing a hand lay-up to form the final shape. An example of the successful injection molding of sample parts is shown in FIG. 3 herein. This material can as well be strip wound onto a mandrel or can be rotomolded into a desired shape.

The effectiveness of the proposed material system was assessed by measuring the thickness of the remaining material after exposure to an 8 second firing of both non-aluminized and aluminized solid rocket propellant motors. Measurements were made at increments along the inner surface of a test cone (e.g., per FIG. 3 hereof), and were described as low mass flux region (measure of hot gas flow) at the widest portion of the cone, medium mass flux region at 80% of the way along its length, and high mass flux region at the narrowest portion of the cone. Two sizes of carbon nanofibers (PR-19-PS (diameter of 100-200 nm with a length of 30-100 microns) and PR-24-PS (diameter of 60-150 nm with a length of 30-100 microns) grades were evaluated, both demonstrating significantly more ablation resistance when compared to the prior art Kevlar™ filled EPDM rubber. This comparison is shown in FIG. 4. The error bars represent a single standard deviation. The results indicate a strong improvement over prior art materials, particularly in the high mass flux region.

This invention thus describes the use of carbon nanofibers (CNF, fibers with the diameter in the range of 60-200 nm and a length of 30-100 microns) in a polyurethane matrix for use in SRM insulation. Testing of this polymer nanocomposite indicates a ablation resistance twice that of prior art materials. Carbon nanofibers are much smaller than conventional continuous or milled carbon fibers (5-10 microns in diameter)

and are considerably larger than single or multiwall carbon nanotubes (1-10 nm in diameter).

The carbon nanofibers are blended into the polymer of choice using blending techniques that are that can uniformly disperse the carbon nanofibers into the polymer. The filled material is then extruded or injection-molded into a desired shape. Or the carbon nanofibers can be dispersed into the polyurethane matrix by spraying techniques. Such processes are cost effective and can facilitate fabrication of SRMs by using net shape components.

That is, the extrusion step can be a blending step. For sprayable systems, it can either be blended into one of the monomers before spraying or it can be co-sprayed as an exterior spray with a concentric spray gun.

The described invention has the advantages of being reprocessible, injection moldable, recyclable (using traditional polymer blending equipment) or sprayable, and has reduced ablation rates which also results in a net weight saving. The invention will also result in time and money savings by eliminating hand lay-ups.

Thus the proposed invention provides blends of carbon nanofibers with preferably, a diameter range of 60-200 nm, a length range of 30-100 microns and an aspect ratio range of 500-3000, into a thermoplastic polyurethane, using traditional polymer blending techniques. The filled material is then either extruded or injection-molded into a desired shape. The blends can also be sprayed on or into a desired shape. Initial tests of this material in an insulation test bed, show a major improvement in ablation rate over the current state of the art. Coupled with ease in processing and reduced ablation over the prior art, this results in a material that is an important advance in the technology. The invention further provides a reduction in weight of SRM insulation so as to permit an increase in payload thereon.

What is claimed is:

1. A method for providing an insulative layer in a solid rocket motor (SRM) comprising, blending carbon nanofibers (CNF) in a thermoplastic polyurethane elastomer matrix (TPU) to form a polymer nanocomposite (PNC) and installing same as said layer wherein said PNC is sprayable or moldable and is installed by spraying into said SRM or is molded, then inserted into said SRM to form said layer in near net shape.

2. The method of claim 1 wherein said fibers are 50-150 nm in diameter and of a length of 50-100 microns.

3. The method of claim 1 wherein said fibers are blended before or during extrusion, or spraying or before injection molding.

4. The method of claim 1 wherein said PNC is extruded and injection molded to a desired form.

5. The method of claim 1 wherein said matrix is a TPU which is sprayed on or into a desired shape.

6. The method of claim 1 wherein said PNC is conveyed to a molding stage or spraying stage to form said layer.

7. The method of claim 1 wherein said CNF is blended with said TPU by feeding same to twin screw extrusion means for blending, and feeding the blend to injection molding or to spraying means.

8. The method of claim 1, wherein said layer is installed in said SRM between solid rocket propellant and rocket motor casing.

9. The method of claim 4, wherein the molded PNC is inserted into said SRM, in one or more sections, to form said layer.

* * * * *